US012054166B2

(12) United States Patent
Deckmyn et al.

(10) Patent No.: US 12,054,166 B2
(45) Date of Patent: Aug. 6, 2024

(54) DRIVELINE COMPONENT CONTROL AND FAULT DIAGNOSTICS (71) Applicant: Dana Belgium N.V., Bruges (BE)

(72) Inventors: Peter Deckmyn, Koekelare (BE); Bjorn Aelvoet, Lievegem (BE)

(73) Assignee: DANA BELGIUM N.V., Bruges (BE)

( * ) Notice: Subject to any disclaimer, the term of this patent is extended or adjusted under 35 U.S.C. 154(b) by 410 days.

(21) Appl. No.: 17/320,099

(22) Filed: May 13, 2021

(65) Prior Publication Data

US 2022/0363277 A1 Nov. 17, 2022

(51) Int. Cl.
*B60W 50/035* (2012.01)
*B60R 16/023* (2006.01)
*G06F 3/06* (2006.01)
*G07C 5/10* (2006.01)
*B60K 6/22* (2007.10)

(52) U.S. Cl.
CPC ....... *B60W 50/035* (2013.01); *B60R 16/0231* (2013.01); *G06F 3/0622* (2013.01); *G06F 3/0659* (2013.01); *G06F 3/0683* (2013.01); *G07C 5/10* (2013.01); *B60K 6/22* (2013.01); *B60W 2710/08* (2013.01); *B60W 2710/10* (2013.01); *B60W 2710/12* (2013.01); *B60W 2710/18* (2013.01); *B60Y 2200/91* (2013.01); *B60Y 2200/92* (2013.01)

(58) Field of Classification Search
CPC ........... B60W 50/035; B60W 2710/08; B60W 2710/10; B60W 2710/12; B60W 2710/18; B60W 50/0205; B60W 2050/022; B60W 50/029; B60W 2050/0295; B60R 16/0231; B60R 16/02; G06F 3/0622; G06F 3/0659; G06F 3/0683; G06F 3/061; G06F 3/0635; G06F 8/658; G06F 8/10; G06F 8/70; G07C 5/10; G07C 5/0841
See application file for complete search history.

(56) References Cited

U.S. PATENT DOCUMENTS

| 4,495,457 | A | 1/1985 | Stahl |
| 6,357,289 | B1 | 3/2002 | Futawatari |
| 6,591,167 | B1 * | 7/2003 | Minowa .................... G06F 8/66 |
| | | | 701/1 |
| 7,424,666 | B2 * | 9/2008 | Chandwani ......... G06F 11/0724 |
| | | | 714/799 |
| 7,794,349 | B2 | 9/2010 | Gierer et al. |
| 7,857,728 | B2 | 12/2010 | Tasaka et al. |

(Continued)

FOREIGN PATENT DOCUMENTS

| DE | 102007031769 A1 | 1/2009 |
| EP | 2952784 A1 | 12/2015 |

*Primary Examiner* — Jelani A Smith
*Assistant Examiner* — Alyssa Rorie
(74) *Attorney, Agent, or Firm* — McCoy Russell LLP (57) ABSTRACT Methods and systems are provided for driveline control and diagnostics. In one example, a vehicle system may include a controller with instructions stored in a first memory unit and when executed by a first processing unit cause the controller to write mechanical vehicle component operating data to a shared memory unit. The controller further includes instructions stored in a second memory unit that when executed by a second processing unit cause the controller to read the mechanical vehicle component operating data to determine data validity.

16 Claims, 6 Drawing Sheets (56) References Cited

U.S. PATENT DOCUMENTS

| | | |
|---|---|---|
| 7,970,524 B2 | 6/2011 | Gruenter |
| 7,980,981 B2 | 7/2011 | Kawaguchi et al. |
| 8,548,712 B2 | 10/2013 | Oesterreicher et al. |
| 9,098,356 B2* | 8/2015 | Lee .................. G06F 9/545 |
| 9,098,462 B1* | 8/2015 | McNicholl ............ G06F 15/163 |
| 9,235,727 B2 | 1/2016 | Thomas et al. |
| 9,738,288 B2 | 8/2017 | Inoue et al. |
| 10,127,161 B2 | 11/2018 | Wegner et al. |
| 10,696,289 B2 | 6/2020 | Shelton et al. |
| 2008/0309163 A1* | 12/2008 | Hashimoto ......... H02J 7/00308 |
| | | 361/86 |
| 2010/0262800 A1* | 10/2010 | Ishioka .................. G09G 5/39 |
| | | 711/E12.091 |
| 2013/0198550 A1* | 8/2013 | Yoshida ................. G06F 1/26 |
| | | 713/324 |
| 2015/0127983 A1* | 5/2015 | Trobough ........... G06F 11/2733 |
| | | 714/30 |
| 2016/0147587 A1* | 5/2016 | An ....................... G06F 11/079 |
| | | 714/37 |
| 2018/0072306 A1 | 3/2018 | Yamazaki et al. |
| 2018/0258251 A1 | 9/2018 | Toledo Antonio et al. |
| 2019/0204801 A1* | 7/2019 | Imai .................. G05B 19/0426 |
| 2019/0235448 A1 | 8/2019 | Banginwar et al. |
| 2020/0273267 A1* | 8/2020 | Takahashi ............. G06F 11/22 |
| 2022/0017107 A1* | 1/2022 | Shinoda .............. B60W 50/029 |
| 2022/0197529 A1* | 6/2022 | Sealing ................ G06F 3/0622 |

* cited by examiner

DRIVELINE COMPONENT CONTROL AND FAULT DIAGNOSTICS

TECHNICAL FIELD

The present description relates generally to methods and systems for controlling and diagnosing a driveline component using a multi-core processor having a shared memory unit.

BACKGROUND AND SUMMARY

Automotive fault diagnostic standards that are intended to enhance vehicle operation continue to evolve. These standards may give rise to engineering challenges and delay vehicle development. For instance, the fault diagnostic standards may have programmatic rigidity that creates barriers to streamline integration of the diagnostic applications into a vehicle's existing control architecture. Further, updates to the control platform and associated hardware may not track with developments in the diagnostic standards. Because these timelines may be out of sync, in certain cases, further delays in vehicle product development may occur. Increased production time and costs may be the consequence of the development delays.

U.S. Pat. No. 9,235,727 B2 to Thomas et al. discloses a functional software architecture for implementing automotive functional standards. The software architecture is used in a process to decompose fault software, separating a fault related application from an application for automotive control.

The inventors have recognized several drawbacks with the automotive control platform disclosed in Thomas as well as other automotive control systems. For instance, Thomas' control and fault architecture may demand the use of firmware functions to access data for the fault application. Accessing data through the firmware functions may present obstacles to independently updating the control and fault applications as well as integrating diagnostic applications into an existing control architecture. More generally, the memory partitioning in the system may exacerbate issues related to altering the control applications and fault application retesting. Furthermore, other diagnostic systems may be susceptible to compounding component faults. Hence, previous vehicle systems may fall short of achieving fault diagnostic goals, such as freedom from interference (FFI).

To resolve at least a portion of the aforementioned drawbacks, a vehicle system is provided. In one exemplary approach, the vehicle system includes a controller in electronic communication with a mechanical vehicle component. The controller comprises a first and second processing unit, a first and second memory unit, and a shared memory unit. In the system, instructions are stored in the first memory unit that when executed by the first processing unit cause the controller to write mechanical component operating data to the shared memory unit. Further in the system, instructions are stored in the second memory unit that when executed by the second processing unit cause the controller to read the mechanical component operating data from the shared memory unit to determine data validity. In this way, a dedicated memory unit may be used to efficiently transfer share data between the processing units while allowing other programmatic functions to be executed by different processing units, if desired.

In one example, the second processing unit may execute instructions which determine the validity of the data stored in the shared memory unit. The first processing unit may, conversely, execute nominal control functions for the mechanical component. If it is determined that the data in invalid, the second processing unit may place the mechanical component in a fault state. This fault state may override the nominal control commands to reduce the chance of component degradation, thereby increasing vehicle longevity. The independent function of each processing unit decreases the likelihood of cascading component faults by circumventing the need to access firmware functions from fault diagnostic functions to retrieve their input values. Consequently, FFI can be achieved by the control system. Further, the execution of control logic and diagnostic logic via separate processing units allows either application to be added to the system and/or altered without demanding alteration of the other application. Consequently, control applications may evolve independent from the diagnostic application or vice versa, if wanted. In this way, updates to the control or diagnostic application may be more efficiently implemented, thereby reducing the time and resources devoted to updates.

Further in another example, the mechanical component operating data may be written to the shared memory unit using a hook function. The hook function specifically intercepts the data exiting a nominal control application upstream of a board support package (BSP). This vehicle data management technique further decreases the likelihood of cascading component degradation. Moreover, placing the hook function upstream of the BSP allows control applications to be updated or otherwise altered independent from the fault logic or vice versa. As such, control applications may be altered to enhance vehicle operation without demanding the recertification of fault diagnostics.

In yet another example, the mechanical vehicle component may be operated in an active fault state when data invalidity is confidently determined. For instance, when the mechanical component is a gearbox clutch, placing the clutch in a fault state may involve disengagement of the clutch to inhibit torque transfer to the drive wheels. In an example where the mechanical component is a locking differential, the differential may be unlocked in a fault state to reduce the chance of differential degradation caused by sustaining differential lock at relatively high vehicle speeds. In this way, the system may guard against component degradation and undesired vehicle behavior to increase vehicle longevity and avoid unwarranted vehicle servicing and repair.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to driveline component control strategies and fault diagnostics in a vehicle system. The fault diagnostic routine may utilize component control data that is efficiently redirected to a memory unit, shared between two cores of a multi-core processor, for data validation. To redirect the data, a hook function may be employed. The hook function intercepts control data (e.g., input/output (IO) and/or controller area network (CAN) values) upstream of a firmware layer, such as a board support package (BSP), and writes component control data to the shared memory. This data management strategy allows the control data to be efficiently redirected to the shared memory. Further, the first core may execute a nominal control application while the second core may execute a fault diagnostic application. The separation of the control and diagnostic logic allows for independent alteration of control and fault applications. Because of the ability to separately update or otherwise alter the control and fault logic, system adaptability is increased. This adaptability may result in efficient integration of the fault diagnostics into a legacy control application as well as the ability to independently update the diagnostic and control applications. The fault diagnostic applications may use the operating data stored in the shared memory to determine if a component fault is present. When the data confidently signifies a fault condition is occurring, the driveline component may be operated in a fault state by the second core. The outgoing request to set an active fault state of the mechanical vehicle component has priority over nominal control logic settings of the controller. In this way, the driveline component can operate in a state which reduces the chance of further component degradation and cascading faults and can achieve freedom from interference (FFI), if wanted. Decreased system maintenance cost and increased customer appeal may stem from operating the driveline component in the fault state.

Figure 1:
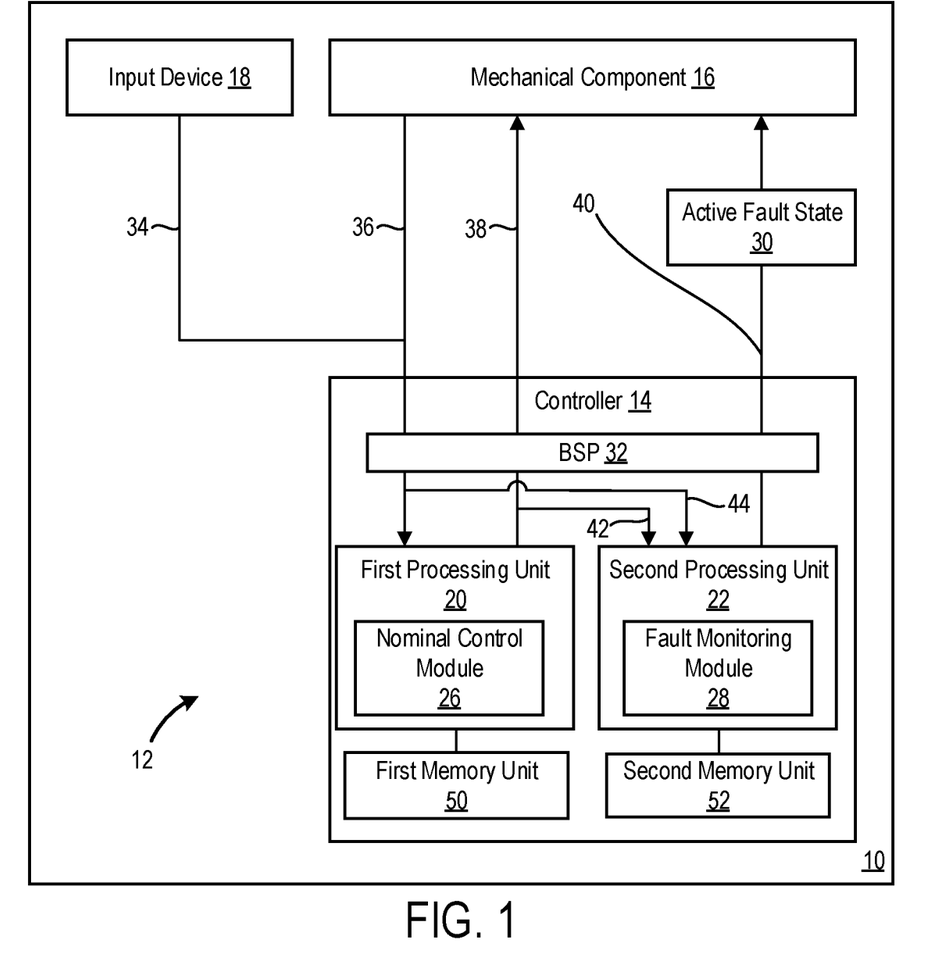
FIG. 1 is a schematic depiction of a vehicle system with a controller that includes multiple processing units.
Figure 2:
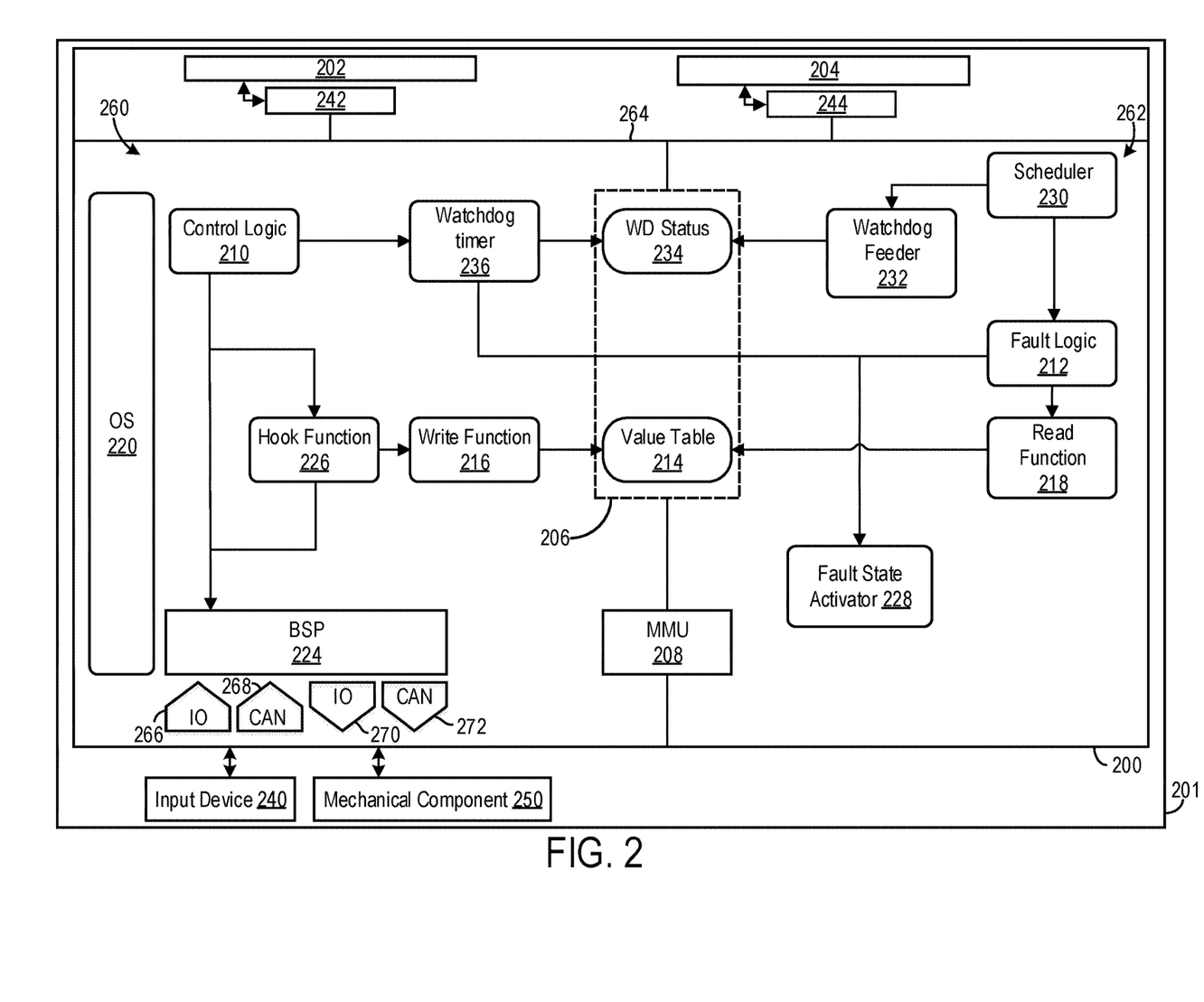
FIG. 2 is a detailed illustration of a first example of a vehicle system's diagnostic and control architecture.
Figure 3:
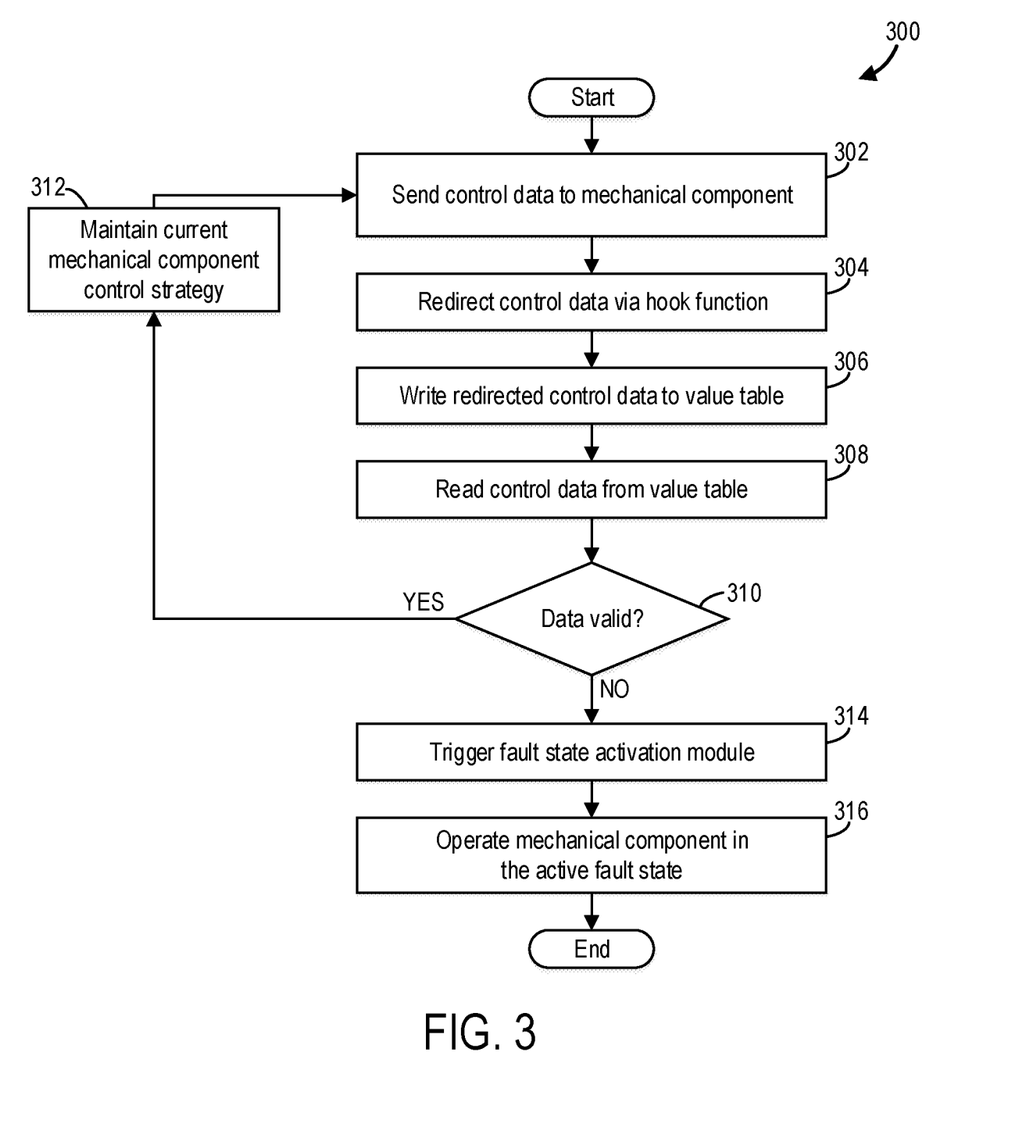
FIGS. 3-4 are flowcharts of diagnostic and control strategies for a vehicle system.
Figure 4:
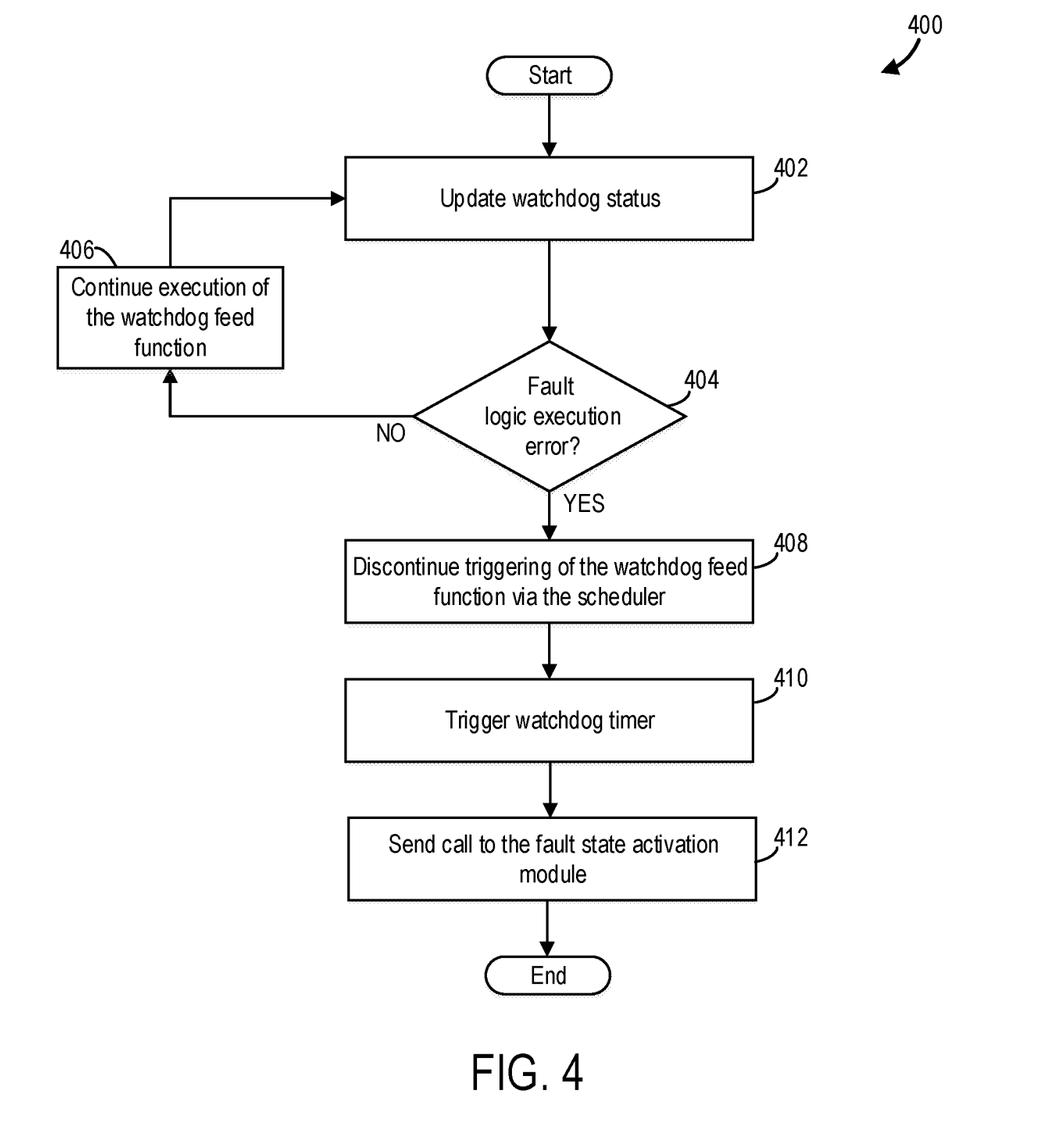
Figure 5:
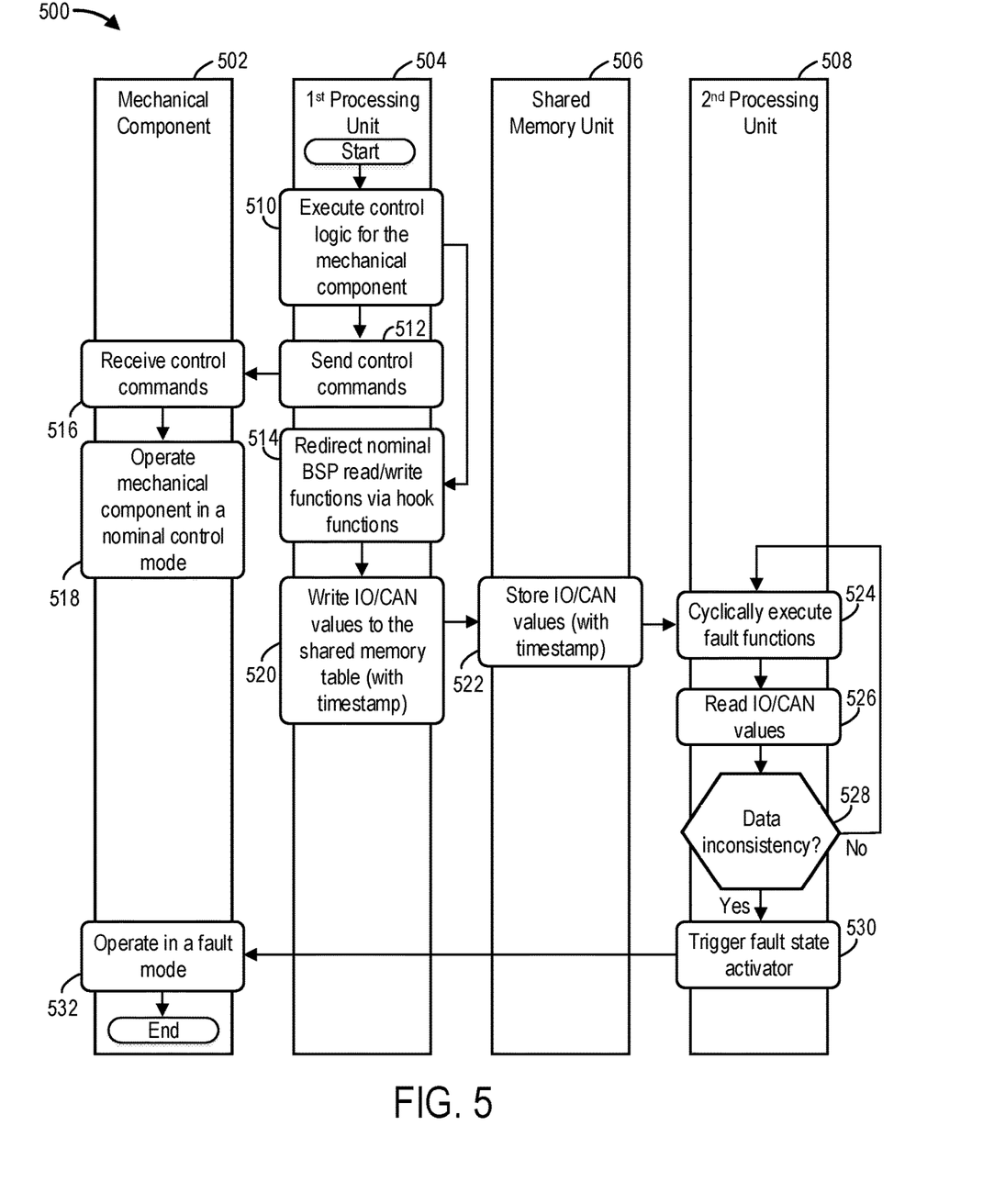
FIG. 5 is a more detailed flowchart of another diagnostic and control strategy for a vehicle system.
Figure 6:
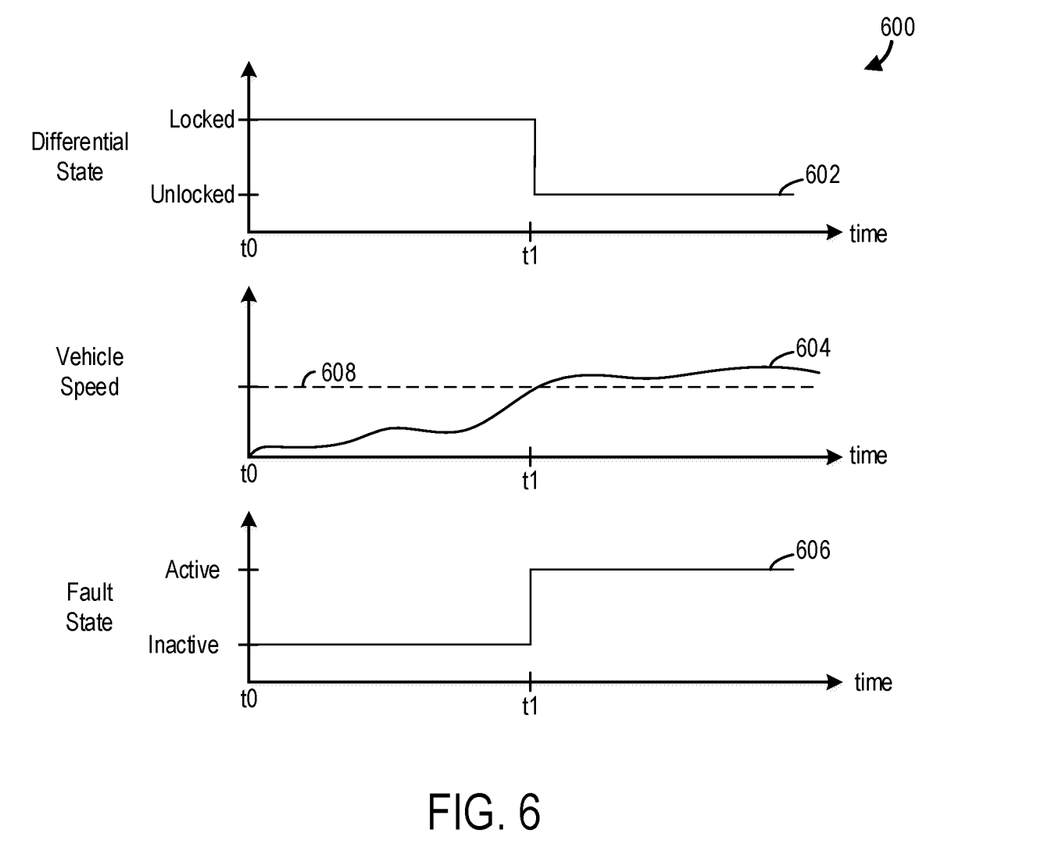
FIG. 6 is a timing diagram depicting a use-case control and fault diagnostic strategy.

FIG. 1 illustrates a high-level vehicle system architecture that uses different processing units to execute a nominal control module and a diagnostic (fault monitoring) module. FIG. 2 shows a more detailed illustration of a vehicle system's diagnostic and control architecture, particularly showing the various logic modules that are executed by different processing units of a controller, and the memory unit shared between the processing units. This configuration allows diagnostic routines to be executed independently from, and in tandem with, nominal control strategies, providing an efficient and effective way of determining fault conditions. Further, the separation of diagnostic and control applications allows for either to be updated and/or altered as desired, without affecting the other, thereby enhancing the system's adaptability. FIGS. 3 and 4 depict flow charts for confidently diagnosing a mechanical component fault and/or undesired vehicle behavior. FIG. 5 shows a more detailed flow chart of a control and diagnostic method, particularly depicting data flow amongst various components of the system. FIG. 6 depicts a timing diagram of a use-case control and diagnostic strategy in which a differential is unlocked in an active fault state to reduce the likelihood of component degradation and increase component longevity.

FIG. 1 is a schematic illustration of a control and diagnostic architecture for a vehicle 10. The vehicle 10 may be a light, medium, or heavy duty vehicle designed for on and/or off-road travel. To elaborate, the vehicle may include a power source such as an internal combustion engine, electric machine (e.g., motor-generator), combinations thereof, and the like. Thus, the vehicle may be a hybrid electric vehicle, a battery electric vehicle (BEV), or a combustion engine vehicle, in different examples.

A controller 14, mechanical component 16, and input device 18 may reside in a system 12 of the vehicle 10. These components may be in electronic communication (e.g., wired and/or wireless electronic communication) with one another to facilitate data transfer therebetween. The mechanical component 16 may be any adjustable vehicle component (e.g., driveline component) where a fault may occur, including but not limited to a multi-speed gearbox with one or more gearbox clutches, a brake system with braking units, an internal combustion engine, an electric motor, and/or an adjustable differential (e.g., a locking differential, an electronically controlled limited slip differential, or a torque vectoring differential).

To adjust the mechanical component 16, the controller 14 may send commands and/or other signals to the component or vice versa. To elaborate, these control signals may be sent from either a nominal control module 26 or a fault monitoring module 28. Responsive to receiving the command signals from either the nominal control module 26 or the fault monitoring module 28, the mechanical component may be adjusted by an actuator. For instance, the nominal control module may send nominal control commands to the mechanical component. In this way, the actuator may alter the state of the component in response to receiving control signals. For instance, the controller may send an engagement command to the brake system, and responsive to receiving the command, the brake system may operate actuators to engage brake units to slow the vehicle. The other controllable components in the vehicle may function in a similar manner.

The input device 18 is designed to receive operator input and responsively generate an input signal, command, etc. transmitted to the controller. Hence, the input device allows a vehicle operator to request adjustment of a vehicle operating parameter such as a braking force, engine power output, engine speed, differential configuration (e.g., a locked or an unlocked configuration), etc. Examples of the input device include an accelerator pedal, brake pedal, clutch pedal, gear selector, gear stick, buttons, knobs, touch interfaces, graphical user interfaces (GUIs), combinations thereof, and the like. When the mechanical component is a differential, the input device may be a button, knob, touch interface, etc. designed to generate a differential locking and unlocking request. Hence, the operator may lock and unlock the differential according to their predilection. Additionally, or alternatively, the differential may be automatically locked and unlocked via controller logic that takes into account vehicle operating conditions when locking and unlocking the vehicle differential. For instance, the controller may automatically lock the differential when the vehicle speed is below a threshold value (e.g., a positive non-zero value) and wheel slip is occurring.

The controller 14 may include multiple processing units (e.g., cores and/or other suitable chip constituents in a single integrated circuit (IC)). To elaborate, the controller may comprise a first processing unit 20 for nominal control logic and a second processing unit 22 for fault monitoring. The processing units 20, 22 may carry out different logic modules. The processing units are specifically designed to execute instructions that may be in the form of logic modules, programs, and/or other suitable data structures. As described herein, a logic module is a set of instructions (e.g., tasks, algorithms, and the like) that performs selected operations, functions, etc. when executed. In particular, the processing unit 20 may execute a nominal control module 26 stored in a first memory unit 50 and the processing unit 22 may execute the fault monitoring module 28 that is stored in a second memory unit 52.

As described herein, a memory unit may include know data storage mediums such a read only memory (ROM), random access memory (RAM), volatile memory, keep alive memory (KAM), combinations thereof, and/or other suitable types of memory. Further, the memory units may utilize semiconductor, magnetic, and/or optical storage mediums. The memory architecture is described in greater detail herein with regard to FIG. 2.

The nominal control module 26 may include applications designed to implement control strategies for the mechanical component. Conversely, the fault monitoring module 28 may include applications for checking mechanical component control data validity. When data invalidity is determined, the fault module may trigger an active fault, thereby placing the component in a fault state. As such, a fault state command 30 may be sent to the mechanical component 16 from the second processing unit 22. Because of the execution of the fault monitoring module 28 and the nominal control module 26 at distinct processing units 22 and 20, respectively, the system's adaptability, and specifically updatability, is enhanced. For instance, the demarcation of the control and fault applications into distinct processing cores allows each application to be independently updated, maintained, etc. As such, the diagnostic application may be efficiently integrated into an existing control architecture or the diagnostic and control updates may occur on different timelines. Further, the control and diagnostic modules may be more efficiently implemented when they are executed by separate processing units.

The controller 14 may further include a BSP 32 or other suitable firmware for accessing controller hardware. To elaborate, the BSP 32 may be an application programming interface (API) designed to access a specific hardware component. For instance, the API may be firmware that includes logic programmed into read only memory (ROM). Hence, the BSP 32 may include routines, such as drivers, that allow an operating system (OS) to interact with system hardware (e.g., the processing units 20, 22 and associated memory units). The BSP may include a boot-loader program, for example. Further, the BSP may provide data structures (e.g., file structures) that start-up the boot-loader as well as initialize processors, communication busses, clocks, and/or memory in the vehicle control system.

In FIG. 1, linear arrows characterize the high level data flow pattern in the system. To elaborate, arrows 34, 36 indicate the transfer of data from the input device 18 and the mechanical component 16, respectively, to the first processing unit 20. Additionally, arrow 38 indicates the transfer of data from the first processing unit 20 to the mechanical component 16. Arrow 40 indicates the transfer of data from the second processing unit 22 to the mechanical component 16. As such, each arrow indicates data that may be sent from controller hardware to a vehicle component and received by said vehicle component or vice versa.

Each of the data paths indicated via the arrows 34, 36, 38 may travel through the BSP 32. However, mechanical component control data, sent from or received by the first processing unit 20, may be routed to the second processing unit 22, upstream of the BSP 32, indicated via arrows 42, 44, respectively. Redirecting the control data upstream of the BSP to the second processing unit 22 enables the system 12 to achieve greater fault containment, thereby reducing the likelihood of cascading component faults. Further, the data path indicated via arrow 40 may travel from the second processing unit 22 to the mechanical component 16. The second processing unit may be an API (e.g., a second BSP) to carry out said data transfer.

FIG. 2 illustrates an example control architecture for a vehicle system 201. The vehicle system 201 includes a controller 200. The controller 200 and vehicle system 201 shown in FIG. 2 may share common structural and functional features with the controller 14 and vehicle system 12, depicted in FIG. 1. As such, the vehicle system 201 includes an input device 240 and a mechanical component 250 in electronic communication with the controller 200.

The controller 200 may include a processor with multiple processing units (e.g., cores), referred to in the art as a multi-core processor. The controller may specifically include a first processing unit 202 and a second processing unit 204. The processing units 202, 204 may reside on a single IC. However, in other examples, the processing units may be integrated into multiple chips that reside in a single physical package. As such, the processing units and/or other controller components may be housed in a common enclosure, in one example. Alternatively, separate enclosures may be used to house different portions of the controller's components. Each processing unit in the processor is capable of reading and executing program instructions that may be stored in an associated memory unit.

A first memory unit 242 that stores instructions executed by the first processing unit 202 and a second memory unit 244 that stores instructions executed by the second processing unit 204 are included in the controller 200. The memory units 242, 244 may be distinct devices designed to execute separate logic modules (e.g., a control module and a diagnostic module, respectively), in one example. The memory devices may therefore be collocated on a common board or chip, for instance, or may be spaced away from one another, in alternate configurations. To elaborate, the first processing unit 202 and the first memory unit 242 may be physically separated and distinct from the second memory unit 244 and the second processing unit 204. For instance, the first processing and memory units may be included on a first circuit board while the second processing and memory units may be included on a second discrete circuit board. As such, the circuit boards may be at least partially housed in separate enclosures, in one example, or may be physically separate components but collocated in a common enclosure, in another example. In yet another example, the first processing and memory units may be included in a first controller that is distinct from a second controller which includes the second processing and memory units.

Conceptual representations of storage spaces 260, 262 in the first and second memory units 242, 244, respectively, delineated via lines 264, are further shown in FIG. 2. The controller's memory may further include a shared memory unit 206, distinct from the first and second memory units and discussed in greater detail herein. Generally, the first memory and processing units 242, 202, respectively, may store and execute normal processing logic for controlling the mechanical component 250, for instance. Conversely, the second memory and processing units 244, 204, respectively, may store and execute diagnostic logic (e.g., fault monitoring logic). As such, an OS 220, control logic module 210, hook function module 226, write function 216, BSP 224, and/or watchdog timer 236 may be stored in the first memory unit 242 and are correspondingly executable by the first processing unit 202. On the other hand, a scheduler 230, watchdog feeder module 232, fault logic module 212, read function 218, and fault state activation module 228 may be stored in the second memory unit 244 and are correspondingly executable by the second processing unit 204. Separating the logic modules in this way allows the control and diagnostic modules to be independent from one another. Because of this independence, the fault diagnostic module may be added to legacy control application without altering the control application, if wanted. The independence of the control application and diagnostic module may further enable the control and diagnostic logic to be updated on different timelines, decreasing the time and cost devoted to the updates. In this way, the programmatic flexibility of the system is enhanced. This independence may even further enable control and diagnostic routines to be efficiently implemented at overlapping intervals without undesired influence on one another.

Further, the modules and other functions executed by the first processing unit 202 may be divided into supervisory mode functions and user mode functions, to allow the rerouting of the control data for diagnostic purposes to take place solely via the first processing unit and inhibit user tampering. For instance, the OS 220 and the control logic module 210 may be operated in user mode. On the other hand, the watchdog timer 236, the hook function module 226, the write function 216, and/or the BSP 224, executed by the first processing unit 202, may run in a supervisor mode. Further, in the second processing unit 204 the scheduler 230, watchdog feeder 232, fault logic module 212, read function 218, and fault state activation module 228 may additionally be operated in a supervisor mode. The software component operating in the user mode may have less privileges with regard to processing unit operation, memory access, IO operation, etc. than the software components operating in the supervisor mode. Further, by operating the data redirection functions in supervisor mode, the likelihood of data tampering is reduced.

The BSP 224 is a logic layer (e.g., API) designed to access hardware. The relevant calls in the context of the disclosure may be calls to set or retrieve the values of CAN signals or IO ports (e.g., analog voltage, a pulse width modulation (PWM) signal, and/or a frequency signal connected to an IO port).

Further, the shared memory unit 206 may have a watchdog status 234 stored therein, in the form of a table, file, or other suitable data storage technique. A value table 214 may further reside in the shared memory unit 206. This shared memory data allows the two processing units to share selected types of data between one another for driveline diagnostics while protecting against unwanted overlaps in data processing.

The controller may further include a memory management unit (MMU) 208. The MMU is a hardware device that permits and restricts memory access of each processing unit. The MMU 208 may therefore restrict the second processing unit's access to the first memory unit 242 and conversely may restrict the first processing unit's access to the second memory unit 244. In other words, the MMU 208 may restrict memory access to a dedicated and exclusive memory space (memory units 242, 244, respectively) for each of the processing units 202, 204. Further, the MMU 208 may set the access to shared value table 214 as a write-only access from the processing unit 202 and a read-only access from processing unit 204. To elaborate, FFI with regard to memory usage may be achieved by the MMU due to the selected restriction of memory access by the processing units, the shared memory access using a dedicated API, and the shared memory write access solely from the first processing unit 202, for example.

To accomplish the memory restriction functionality, the MMU 208 may utilize virtual address spaces with ranges of addresses permitted/inhibited for use by each processing unit, for instance. However, other suitable memory restriction techniques may be used by the MMU. Further, the MMU 208 may set the access to the watchdog status value 234 as a read-only access from processing unit 202 and a write-only access from processing unit 204. In this way, the watchdog status values may be guarded against errors to increase the system's confidence in fault state diagnostics.

The general process flow through the control and diagnostic system may begin with running control logic for the mechanical component 250 via the control logic module 210. The control logic may react on input values from input ports 266 (e.g., dedicated input ports) and/or CAN values 268. The values may include an analog voltage, a PWM signal, and/or a frequency signal connected to an IO port.

Next, the values may be retrieved from the BSP 224 via a BSP read function, for instance. As a result of processing these values, the control logic module 210 may issue updated control commands (e.g., settings) for output ports 270 and/or CAN values 272 via a write function of the BSP 224.

As the setting are sent from the control logic module 210 to the output ports 270 and CAN values 272 via the BSP 224, the first processing unit 202 redirects nominal BSP read/write functions to hook functions in the hook function module 226. In some examples, the hook function may read the original BSP read/write function and use the write function 216 to write an IO value and/or a CAN value to the shared value table 214 of the shared memory unit 206. In this way, component control data traveling between the control module and the BSP may be efficiently redirected to the shared memory upstream of the BSP. The use of the hook functions may permit independent execution of the nominal control logic via the module 210. Consequently, the data used for fault diagnostics may be gathered in a way that conserves processing resources and avoids unwanted influence on the nominal control application. Further, the write function 216 may update a timestamp in the shared value table 214 at each value update. Timestamping the values written into the shared table enables the data to be efficiently retrieved by the fault logic module 212.

For fault diagnostics, the second processing unit 204 executes diagnostic routines via the fault logic module 212. The execution of the fault logic module 212 may occur independently of execution of the control logic module 210 to reduce the chance of cascading faults and achieve FFI, in certain instances. As such, the fault logic module 212 and the control logic modules are executed on distinct processing units (e.g., cores) with independent tasks.

The scheduler 230 may trigger (e.g., cyclically trigger) execution of the fault logic module 212. In this way, the diagnostics may be automatically triggered to regularly check for faults. Next, the fault logic module 212 may utilize read function 218 to retrieve the timestamped IO and/or CAN values from the shared value table 214 of the shared memory unit 206. The read function may therefore retrieve these values from the shared memory unit 206 as opposed to using BSP read calls. In this way, interaction between the processing units is avoided to facilitate control and diagnostic application independence.

After the data retrieval from the shared memory, the fault logic module 212 then executes verification logic to determine data validity in order to judge if an active fault condition is occurring in the mechanical component 250. In other words, the verification logic may validate the consistency of the data in the shared table. Rules for determining data consistency may be based on invariants specific to the mechanical component to be diagnosed and controlled. For instance, in one use-case example, when a neutral shift position is requested, a corresponding mechanical component (e.g., clutch) is slated for disengagement within a given timespan.

In the case that the retrieved data is determined to be invalid (e.g., inconsistent), the fault logic module 212 may make a call to the fault state activation module 228 to operate the mechanical component 250 of vehicle system 201 in an active fault state. When the mechanical component is a clutch in a gearbox, the clutch may be disengaged in the fault state inhibit the transfer of torque to the drive wheels. When the component is an adjustable differential, the differential may be unlocked in the fault state. Further, when the component is a brake system, brake units may be engaged or disengaged in the fault state. Ever further, when the component is an engine or electric motor, the engine or motor speed may be decreased and maintained below a threshold value (e.g., a positive non-zero or a near zero value) in the fault state.

In one example, operating the mechanical component 250 in the active fault state includes overriding at least nominal control commands sent to the mechanical vehicle component via the control logic module 210. In this way, under a fault state, normal control logic which may lead to component degradation may be blocked by the diagnostic controller. Consequently, the component and more generally driveline longevity may be increased.

Controller 200 may utilize the watchdog timer 236 in conjunction with the watchdog feeder module 232 to provide fault state activation redundancies. Specifically, the scheduler 230 may further be used to trigger the watchdog feeder module 232 to update the watchdog status value 234. Further, in the first processing unit 202, the watchdog timer 236 may guard against regular execution of fault logic by the module 212 using the value of the watchdog status 234 stored in the shared memory. In this way, the watchdog mechanism may guard against a situation where the fault logic would not be executed due to an internal fault, so as to avoid halted execution of the fault logic. In such an example, a fault state may be triggered.

In case of an execution issue of the fault logic via the module 212, the scheduler 230 may stop feeding the watchdog feeder 232. In response to the discontinued feed, the watchdog timer 236 may be triggered. The watchdog timer 236 may be a hardware timer, in one example, to reduce the chance of timer corruption when compared to a software timer. Alternatively, a software watchdog timer may be utilized, in some scenarios. When the watchdog timer 236 is triggered, the timer may make a call to the fault state activation module 228. In this way, triggering of the watchdog timer may initiate operation of the mechanical component in a fault state. It will be appreciated that this call may be directed through an API such as a BSP to override nominal control of the mechanical component.

The controller architecture illustrated in FIG. 2 guards against (e.g., prevents) the possibility of cascading faults which may result in a catastrophic fault through the avoidance of accessing firmware functions (e.g., BSP functions) from fault functions to retrieve their input values. In this way, the vehicle system may simply and effectively achieve FFI (e.g., achieve FFI as dictated by International Organization for Standardization (ISO) 26262) on a dual-core processor. The controller architecture further enables fault logic to be efficiently integrated into legacy control applications with alteration of the legacy application, if wanted. Still further, the control application may be updated or otherwise evolve without recertifying the diagnostic application.

FIG. 3 illustrates a method 300 for vehicle system operation and diagnostics. The method 300 as well as the other methods described herein may be executed by controllers 14 and/or 200 and vehicle systems 12 and/or 201, shown in FIGS. 1-2. Alternatively, the method 300 and/or the other methods described herein may be implement by another suitable controller, vehicle system, and corresponding components. Further, instructions for carrying out the method 300 and the rest of the methods included herein may be executed by a controller based on instructions stored on different memory units of the controller and in conjunction with signals received from the vehicle system. The controller may employ actuators of the vehicle system to adjust vehicle operation, according to the methods described below.

At 302, vehicle control data is sent from the first processing unit to the mechanical component, causing the mechanical component to operate in a normal mode based on said control data. For example, engine or motor speed, clutch engagement, differential locking, and the like may be adjusted responsive to an operator's interaction with a corresponding input device.

At 304, at least a portion of the control data is redirected via the hook function module via the first processing unit to the shared memory unit. In this manner, the control data may be efficiently redirected to shared memory while permitting (e.g., assuring) independent execution of the nominal control module. Thus, the diagnostic module may solely rely on the control modules to periodically update the control data (e.g., IO/CAN values) but does not influence the execution of the nominal control module.

Next at 306, the redirected control data is written to the value table in the shared memory unit via the first processing unit. As indicated above, the MMU may permit the first processing unit to write data to the shared memory unit and may permit the second processing unit to read data from the shared memory while inhibiting the second processing unit from writing values to the shared memory. In this way, the shared memory unit may be selectively accessible by the first and second processing units. Such a configuration adds to the reliability of the system, since, for example, the actual control data/commands sent/received within the first processing for the mechanical component cannot be overwritten within the shared memory unit by the second processing unit during diagnostic routines (e.g., fault detection).

At 308, the control data values are retrieved, from the shared memory unit, via a read function of the second processing input. Next at 310, the fault logic module determines if the control data retrieved from the shared memory unit is valid.

If control data validity is determined (YES at 310) the method moves to 312 where the control logic module maintains the current mechanical component operating strategy. For instance, when the mechanical component is an engine or motor, the device's mechanical power output may be adjusted (e.g., increased or decreased) responsive to changes in accelerator pedal position, or when the component is a locking differential, the differential may be locked and unlocked when an operator triggers a differential lock function via a switch or other suitable input device. Further, when the component is a multi-speed gearbox, clutches in the gearbox may opened or closed in response to adjustment of a shift selector, pedal position adjustment, etc. Still further, when the component is a brake system, the degree of brake engagement may correlate to a brake pedal position.

Conversely, if control data invalidity is determined (NO at 310) the method moves to 314 where the fault state activation module is triggered via the second processing unit. Next at 316, the mechanical component is operated in the fault state via commands sent from the second processing unit. Operating the component in the fault state may include overriding control commands generated via the control logic module. For instance, the control module may command the differential to sustain a locked configuration but the fault state activation module may override the command to hold differential locking and unlock the differential. In another example, the control module may command the engine or motor to maintain a current speed but the fault state activation module may overrule the control module and decrease engine or motor speed. Still further in another example, the fault state activation module may override a control module command to decrease braking force by increasing brake engagement in the brake system or vice versa. In this manner, undesired mechanical component behaviors that may lead to component degradation may be avoided.

It will be understood that steps 302, 304, and 306 are executed via the first processing unit while the steps 308, 310, 312, 314 and 316 are executed via the second processing unit. In this way, independence between diagnostic and control application is achieved. FFI through the use of a dual-core processor may therefore be achieved. Further, the execution of the different diagnostic and control steps via the different processing units allows control and diagnostic applications to separately evolve and also allows the diagnostic application to be efficiently incorporated into an existing control application.

FIG. 4 shows another method 400 for fault diagnostics in a vehicle system. At 402, the watchdog status is updated in the shared memory unit by triggering the watchdog feed function at the second processing unit. The watchdog feeder module may guard the regular execution of the fault logic on the second processing unit.

At 404, the method determines whether or not a fault logic execution error or other issue is occurring at the second processing unit. For instance, it may be determined that a fault logic execution error is occurring when the fault logic module fails to perform diagnostic functions, such as sending a fault state call to the fault state activator, within a predetermined time. In some cases, the fault logic module may fail to perform the diagnostic functions because it is in a deadlock.

If a fault logic execution error is not occurring (NO at 404) the method moves to 406 where the execution of the watchdog feed function via the second processing unit is continued. Conversely, if it is judged that there is a fault logic execution error (YES at 404) the method moves to 408 where triggering of the watchdog feed function by the scheduler is discontinued by the second processing unit. For instance, the scheduler may stop feeding the watchdog feeder which will in turn discontinue updates to the watchdog status in the shared memory unit. Next at 410, responsive to the discontinued triggering of the watchdog feed function, the watchdog timer (e.g., hardware watchdog timer) in the first processing unit is triggered.

At 412, responsive to triggering the watchdog timer, the watchdog timer sends a call to the fault state activation module to place the component in a fault state. Method 400 allows issues in the fault logic execution to be efficiently determined and corrective actions to be taken that reduce the chance of driveline component degradation and/or avoid undesired vehicle behavior. By providing multiple paths for determining a fault and controlling operation of the mechanical component accordingly, the system effectively avoids undesired (e.g., prolonged) operation of the mechanical component under degrading conditions to reduce the likelihood of mechanical component degradation component.

FIG. 5 illustrates another control and diagnostic method 500. The controller components (i.e., a first processing unit 504, a shared memory unit 506, a second processing unit 508, and a mechanical component 502) that execute different steps are provided for reference. As indicated above, these components may be similar to the processing and memory units described above with regard to FIGS. 1 and/or 2.

At 510, the first processing unit executes control logic for the mechanical component. For instance, IO and/or CAN values may be sent from a nominal control application to IO and/or CAN ports by way of the BSP. Responsive to execution of the control logic, steps 512 and 514 are implemented. At 512, the first processing unit sends the control commands to the mechanical component and at 516, the mechanical component receives the control commands. At 518, the mechanical component is operated in a nominal control mode. For instance, engine power output may correlate to accelerator pedal position in the nominal control mode. In another nominal control mode, the differential's configuration (locked or unlocked) may correspond to a switch that indicates the operator's desire to lock or unlock the differential.

At 514, the first processing unit redirects nominal BSP read/write functions via hook functions. The hook functions allow data for fault logic to be gathered by the first processing unit without interfering with nominal control logic.

At 520, the first processing unit writes IO/CAN values, redirected via the hook functions, to the shared memory table with a timestamp. The second processing unit relies on the first processing unit to regularly update the data to the shared memory unit, but the second processing unit does not influence execution of the first processing unit. The separation of access to the shared memory allows each of the processing units to function independently, providing for ease in updating and/or maintaining each processing unit application. To clarify, the first processing unit, in this example, may solely access the shared memory via a write function, as effected by the memory management unit. Such a configuration allows for the controller to effectively read and/or write data to the shared memory unit between multiple processing units, advantageously allowing for updates or upgrades to be implemented efficiently in either processing unit. For instance, diagnostic routines executed by the second processing unit may be executed in tandem with driveline control strategies of the first processing unit for effectively operating mechanical component, while also determining fault conditions.

At 522, the shared memory unit stores IO/CAN values with the timestamp. Next, at 524, the second processing unit cyclically executes fault functions which initiates reading of the timestamped IO/CAN values from the shared memory unit at 526. At 528, the second processing unit determines if there is inconsistency in the timestamped IO/CAN values. Data inconsistency may be determined when there are non-sequential timestamp values, the IO/CAN values are outside of predetermined ranges, etc.

If there is not an inconsistency in the data (NO at 528) the method returns to 524 and the mechanical component is maintained in the nominal control mode by the first processing unit. On the other hand, if there is an inconsistency in the data (YES at 528) the method moves to 530 where the fault state activator is triggered. For instance, the fault logic module may make a call to the fault state activator to place the component in a fault mode. In response to triggering the fault state activator, the mechanical component is operated in the fault mode at 532 by overriding the nominal control mode. The fault mode reduces the chance of degradation of the mechanical component, thereby increasing vehicle longevity. Further, method 500 enables a fault in the component to be confidently diagnosed by the second processing unit using values stored in the shared memory to avoid unwanted interaction between the processing units.

FIG. 6 illustrates a timing diagram 600 of a use-case diagnostic control strategy for a driveline component. In each plot of the timing diagram, time is indicated on the abscissa and increases in the direction of the arrow. The ordinate for plot 602 indicates the locking state of the differential (locked and unlocked) and the ordinate for plot 606 indicates the fault state (active and inactive). The ordinate of plot 604 indicates vehicle speed and increases in the direction of the arrow. FIG. 6 also shows a threshold speed 608 for the vehicle. The threshold speed may correspond to a speed above which differential degradation may occur when it is locked.

From t0 to t1 vehicle speed increases while the differential is locked and the fault state is inactive. However, when the vehicle speed surpasses the threshold 608 at t1, the fault state is activated by the second core in the controller and the differential is placed in a fault mode where it is unlocked to guard against degradation. Further, while the fault state remains active, the differential remains unlocked. In this way, the differential may operate in a fault mode to reduce the likelihood of differential degradation and increase the differential's lifespan.

The technical effect of the diagnostic and control systems and methods described herein is to independently, efficiently, and effectively implement a diagnostic strategy and operate a component in a fault mode to decrease the chance of component degradation and increase the component's lifespan. The diagnostic strategy described herein further allows the diagnostic applications to be efficiently incorporated into legacy control applications as well as allows the control applications to be independently updated with limited or in some case no retesting of the diagnostic strategy to decrease development time and cost.

The invention will be further described in the following paragraphs. In one aspect, a vehicle system is provided that comprises: a controller in electronic communication with a mechanical vehicle component, the controller comprising: a processor comprising a first processing unit and a second processing unit; instructions stored in a first memory unit that when executed by the first processing unit, during a first condition, cause the controller to: write mechanical component operating data to a shared memory unit; and instructions stored in a second memory unit that when executed by the second processing unit, during a second condition, cause the controller to: read the mechanical component operating data to determine data validity.

In another aspect, a method is provided for operation of a vehicle system, that comprises: at a first core in a multi-core processor, sending vehicle control data to a mechanical vehicle component; at the first core, redirecting the vehicle control data to a shared memory unit using a hook function; and at a second core in the multi-core processor, reading the vehicle control data using a timestamp value associated with the vehicle control data and determining a validity of the vehicle control data. In one example, the method may include wherein the vehicle control data includes an input/output (IO) value and/or a controller area network (CAN) value sent through a BSP. In another example, the method may include, at the second core, in response to determining the vehicle control data is invalid, operating the mechanical vehicle component in an active fault state. In yet another example, the method may include: triggering a watchdog feed function that updates a watchdog status in the shared memory unit, at the second core; and in response to determining a fault logic execution error, discontinuing the watchdog feed function, triggering a watchdog timer, and operating the mechanical vehicle component in an active fault state. In another example, the method may include wherein instructions for sending and redirecting the vehicle control data are stored in a first memory unit, and wherein instructions for reading the vehicle control data are stored in a second memory unit. In another example, the method may include, at a memory management unit (MMU), restricting access to the first memory unit by the second core; and restricting access to the second memory unit by the first core.

In another aspect, vehicle driveline system is provided that comprises a controller in electronic communication with a mechanical driveline component, the controller comprising: a multi-core processor comprising a first core and a second core; instructions stored in a first memory unit that when executed by the first core, during a first condition, cause the controller to: redirect driveline control data with an associated timestamp value to a shared memory unit using a hook function; instructions stored in a second memory unit that when executed by the second core, during a second condition, cause the controller to: determine the validity of the driveline control data; and instructions stored in the second memory unit that when executed by the second core, when the driveline control data is invalidated, cause the controller to: operate the mechanical driveline component in an active fault state.

In any of the aspects or combinations of the aspects, the vehicle system may include instructions stored in the second memory unit that when executed by the second processing unit, when data invalidity is determined, may cause the controller to: operate the mechanical vehicle component in an active fault state.

In any of the aspects or combinations of the aspects, operating the mechanical vehicle component in the active fault state may include overriding at least a portion of a plurality of nominal control commands sent to the mechanical vehicle component by the first processing unit.

In any of the aspects or combinations of the aspects, writing the mechanical vehicle component operating data to the shared memory unit may include: at the first processing unit, redirecting an input/output (IO) value and/or a controller area network (CAN) value sent to a board support package (BSP) using a hook function; and at the first processing unit, writing the redirected IO value and/or the CAN value to the shared memory unit.

In any of the aspects or combinations of the aspects, writing the redirected IO value and/or the CAN value to the shared memory unit may include writing a timestamp corresponding to the IO value and/or the CAN value.

In any of the aspects or combinations of the aspects, reading the mechanical vehicle component operating data to determine data validity may include accessing the mechanical vehicle component operating data using the timestamp.

In any of the aspects or combinations of the aspects, the vehicle system may include instructions stored in the second memory unit that when executed by the second processing unit may cause the controller to: trigger a watchdog feed function that updates a watchdog status in the shared memory unit; and instructions stored in the second memory unit that when executed by the second processing unit, when a fault logic execution error occurs, cause the controller to: discontinue the watchdog feed function; trigger a watchdog timer in response to discontinuing the watchdog feed function; and operate the mechanical vehicle component in an active fault state in response to triggering the watchdog timer.

In any of the aspects or combinations of the aspects, the vehicle system may include a memory management unit (MMU) that comprises instructions that when executed may cause the controller to: restrict access to the first memory unit by the second processing unit; and restrict access to the second memory unit by the first processing unit.

In any of the aspects or combinations of the aspects, the first processing unit may include a first core and the second processing unit may include a second core.

In any of the aspects or combinations of the aspects, the mechanical vehicle component may be a multi-speed gearbox, a brake system, an engine, an electric motor, or an adjustable differential.

In any of the aspects or combinations of the aspects, the driveline control data may include an input/output (IO) value and/or a controller area network (CAN) value.

In any of the aspects or combinations of the aspects, instructions stored in the second memory unit that when executed by the second core may cause the controller to: trigger a watchdog feed function that updates a watchdog status in the shared memory unit; and instructions stored in the second memory unit that when executed by the second core, when a fault logic execution error is determined, may cause the controller to: discontinue the watchdog feed function; and in response to discontinuing the watchdog feed function, trigger a watchdog timer to initiate operation of the mechanical driveline component in the active fault state; and a memory management unit that comprises executable instructions that when executed may cause the controller to: restrict access to the first memory unit by the second core; and restrict access to the second memory unit by the first core.

In any of the aspects or combinations of the aspects, the driveline component may be a multi-speed gearbox, a brake system, an engine, an electric motor, or an adjustable differential.

In any of the aspects or combinations of the aspects, the first processing unit and the first memory unit may be physically separated from the second processing unit and the second memory unit.

In another representation, a driveline diagnostic method is provided that includes, at a first core of a controller, redirecting control values from calls sent between a nominal control application to a board support package to a shared memory and at a second core of the controller, judging if the control data is consistent and responsive to judging an inconsistency in the control data placing a driveline component in a fault mode of operation.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various vehicle system configurations. The control methods and routines disclosed herein may be stored as executable instructions in non-transitory memory and may be carried out by the control and/or diagnostic systems including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various vehicle hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to combustion engine vehicles, battery electric vehicles (BEVs), or hybrid electric vehicles. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   a controller in electronic communication with a mechanical vehicle component, the controller comprising:
   a processor including a first processing unit and a second processing unit;
   wherein the first processing unit is independent from the second processing unit such that a diagnostic module which is executed by the second processing unit does not influence execution of a nominal control module that is executed by the first processing unit;
a memory management unit (MMU) that comprises instructions that when executed cause the controller to:
restrict access to a first memory unit by the second processing unit;
restrict access to a second memory unit by the first processing unit;
set an access to a shared memory unit as a write-only access from the first processing unit; and
set an access to the shared memory unit as a read-only access from the second processing unit;
instructions stored in the first memory unit that when executed by the first processing unit, during a first condition, cause the controller to:
directly write mechanical vehicle component operating data to the shared memory unit;
instructions stored in the second memory unit that when executed by the second processing unit via the diagnostic module, during a second condition, cause the controller to:
cyclically execute a fault function which includes directly reading the mechanical vehicle component operating data that is stored in the shared memory unit to determine data validity according to a predetermined cycle, independent from the nominal control module; and
instructions stored in the second memory unit that when executed by the second processing unit via the diagnostic module, when data invalidity is determined, cause the controller to:
operate the mechanical vehicle component in an active fault state.

2. The vehicle system of claim 1, wherein operating the mechanical vehicle component in the active fault state includes overriding at least a portion of a plurality of nominal control commands sent to the mechanical vehicle component by the first processing unit.

3. The vehicle system of claim 1, wherein writing the mechanical vehicle component operating data to the shared memory unit includes:
at the first processing unit, redirecting an input/output (IO) value and/or a controller area network (CAN) value sent to a board support package (BSP) using a hook function; and
at the first processing unit, writing the redirected IO value and/or the CAN value to the shared memory unit.

4. The vehicle system of claim 3, wherein writing the redirected IO value and/or the CAN value to the shared memory unit includes writing a timestamp corresponding to the IO value and/or the CAN value.

5. The vehicle system of claim 4, wherein reading the mechanical vehicle component operating data to determine data validity includes accessing the mechanical vehicle component operating data using the timestamp.

6. The vehicle system of claim 1, further comprising:
instructions stored in the second memory unit that when executed by the second processing unit cause the controller to:
trigger a watchdog feed function that updates a watchdog status in the shared memory unit; and
instructions stored in the second memory unit that when executed by the second processing unit, when a fault logic execution error occurs, cause the controller to:
discontinue the watchdog feed function;
trigger a watchdog timer in response to discontinuing the watchdog feed function; and
operate the mechanical vehicle component in the active fault state in response to triggering the watchdog timer.

7. The vehicle system of claim 1, wherein the first processing unit includes a first core and the second processing unit includes a second core.

8. The vehicle system of claim 1, wherein the first processing unit and the first memory unit are physically separated from the second processing unit and the second memory unit.

9. A method for operation of a vehicle system, comprising:
at a memory management unit (MMU), restricting access to a first memory unit by a second core;
a processor including a first core and the second core;
wherein the first core is independent from the second core such that a diagnostic module which is executed by the second core does not influence execution of a nominal control module that is executed by the first core;
at the MMU, restricting access to a second memory unit by a first core;
at the MMU, setting an access to a shared memory unit as a write-only access from the first core;
at the MMU, setting an access to the shared memory unit as a read-only access from the second core;
at the first core in a multi-core processor, sending vehicle control data to a mechanical vehicle component;
at the first core, redirecting the vehicle control data to the shared memory unit using a hook function;
at the second core in the multi-core processor,
cyclically execute a fault function which includes reading the vehicle control data using a timestamp value associated with the vehicle control data and determining a validity of the vehicle control data according to a predetermined cycle, independent from the nominal control module; and
in response to determining the vehicle control data is invalid, operating the mechanical vehicle component in an active fault state.

10. The method of claim 9, wherein the vehicle control data includes an input/output (IO) value and/or a controller area network (CAN) value sent through a board support package (BSP).

11. The method of claim 9, further comprising:
at the second core, triggering a watchdog feed function that updates a watchdog status in the shared memory unit; and
in response to determining a fault logic execution error, discontinuing the watchdog feed function, triggering a watchdog timer, and operating the mechanical vehicle component in the active fault state.

12. The method of claim 9, wherein instructions for sending and redirecting the vehicle control data are stored in a first memory unit and wherein instructions for reading the vehicle control data are stored in a second memory unit.

13. A vehicle driveline system, comprising:
a controller in electronic communication with a mechanical driveline component, the controller comprising:
a processor including a first core and a second core;
wherein the first core is independent from the second core such that a diagnostic module which is executed by the second core does not influence execution of a nominal control module that is executed by the first core;

a memory management unit (MMU) that comprises instructions that when executed cause the controller to:
  restrict access to a first memory unit by the second core;
  restrict access to a second memory unit by the first core;
  set an access to a shared memory unit as a write-only access from the first core; and
  set an access to the shared memory unit as a read-only access from the second core;
a multi-core processor including the first core and the second core;
instructions stored in the first memory unit that when executed by the first core, during a first condition, cause the controller to:
  redirect driveline control data with an associated timestamp value to the shared memory unit using a hook function;
instructions stored in the second memory unit that when executed by the second core via a diagnostic module, during a second condition, cause the controller to:
  cyclically execute a fault function which includes directly reading the mechanical vehicle component operating data that is stored in the shared memory unit to determine data validity according to a predetermined cycle, independent from the nominal control module; and instructions stored in the second memory unit that when executed by the second core, when the driveline control data is invalidated, cause the controller to:
  operate the mechanical driveline component in an active fault state.

14. The vehicle driveline system of claim 13, wherein the driveline control data includes an input/output (IO) value and/or a controller area network (CAN) value.

15. The vehicle driveline system of claim 13, further comprising:
  instructions stored in the second memory unit that when executed by the second core cause the controller to:
    trigger a watchdog feed function that updates a watchdog status in the shared memory unit; and
  instructions stored in the second memory unit that when executed by the second core, when a fault logic execution error is determined, cause the controller to:
    discontinue the watchdog feed function; and
    in response to discontinuing the watchdog feed function, trigger a watchdog timer to initiate operation of the mechanical driveline component in the active fault state.

16. The vehicle driveline system of claim 13, wherein the driveline component is a multi-speed gearbox, a brake system, an engine, an electric motor, or an adjustable differential.

* * * * *